United States Patent
Yano

(10) Patent No.: US 9,519,354 B2
(45) Date of Patent: Dec. 13, 2016

(54) INPUT ASSISTING DEVICE FOR TOUCH PANEL

(71) Applicant: Miyuki Glove Co., Ltd., Kyoto-shi, Kyoto (JP)

(72) Inventor: Katsuhisa Yano, Kyoto (JP)

(73) Assignee: Miyuki Glove Co., Ltd., Kyoto-shi, Kyoto (JP)

(*) Notice: Subject to any disclaimer, the term of this patent is extended or adjusted under 35 U.S.C. 154(b) by 0 days.

(21) Appl. No.: 14/991,596

(22) Filed: Jan. 8, 2016

(65) Prior Publication Data

US 2016/0209934 A1 Jul. 21, 2016

(30) Foreign Application Priority Data

Jan. 15, 2015 (JP) .................................. 2015-005529

(51) Int. Cl.
*G06F 3/03* (2006.01)
*G06F 3/01* (2006.01)
*G06F 3/0354* (2013.01)

(52) U.S. Cl.
CPC .................. *G06F 3/03* (2013.01); *G06F 3/014* (2013.01); *G06F 3/03545* (2013.01); *G06F 2203/0331* (2013.01)

(58) Field of Classification Search
CPC .......... G06F 3/044; G06F 3/039; G06F 3/014; G06F 2203/0331; G06F 3/03; B43K 23/012
See application file for complete search history.

(56) References Cited

U.S. PATENT DOCUMENTS

| 6,626,598 B2 * | 9/2003 | Schneider | B43K 23/012 401/258 |
| 2008/0297491 A1 * | 12/2008 | Adkins | G06F 3/03545 345/179 |
| 2010/0188326 A1 * | 7/2010 | Dines | G06F 3/014 345/156 |

FOREIGN PATENT DOCUMENTS

| JP | H07-104925 A | 4/1995 |
| JP | 2005-141710 A | 6/2005 |
| JP | 2008-176720 A | 7/2008 |
| JP | 2012-247942 A | 12/2012 |

OTHER PUBLICATIONS

Japanese decision to grant a patent dated Jun. 5, 2015.
Japanese notice of the reason for refusal dated Mar. 20, 2015.

* cited by examiner

*Primary Examiner* — Quan-Zhen Wang
*Assistant Examiner* — Xuemei Zheng
(74) *Attorney, Agent, or Firm* — Yokoi & Co., U.S.A.; Toshiyuki Yokoi

(57) ABSTRACT

An input assisting device 50 for a touch panel includes a body portion 51 to be attached to a predetermined portion of a finger, a linear portion 52 that has a width of 5 mm or less and is attached to the body portion 51 so that the linear portion 52 is projected 10 mm or more from the fingertip when the body portion 51 is attached to the predetermined portion, and a contact portion 54 that is provided on a tip portion of the linear portion 52 so that the contact portion 54 is directed from a nail to the inner surface of the finger when the body portion 51 is attached to the predetermined portion. The contact portion 54 is electrically connected with the finger when the body portion 51 is attached to the predetermined portion.

5 Claims, 9 Drawing Sheets

INPUT ASSISTING DEVICE FOR TOUCH PANEL

CROSS-REFERENCES TO RELATED APPLICATIONS

This patent specification is based on Japanese patent application, No. 2015-005529 filed on Jan. 15, 2015 in the Japan Patent Office, the entire contents of which are incorporated by reference herein.

BACKGROUND OF THE INVENTION

1. Field of the Invention

The present invention relates to an input assisting device used for an input of a touch panel of a portable information terminal, a multi-functional mobile phone and other devices.

2. Description of the Related Art

In the portable information terminal, the multi-functional mobile phone and other devices, various figures, symbols and the like are displayed on a relatively large screen. In an interface of such devices, the figures, symbols, and the like are touched by a finger or the like to perform the input. In the above described touch panel, which serves both as a display screen and a touch input device, an input area corresponding to each of the displayed figures and symbols is normally specified to be relatively large to help an operator avoid wrong operation and enable subtle operation. Here, the input area means an area on which the fingers and symbols are displayed to let the devices perform the operation corresponding to each of the displayed figures and symbols when they are touched by the finger or the like. However, the number of figures and symbols displayed on the screen to be selected should be increased in order to achieve various functions. On the other hand, a size of the screen, i.e., a size of the devices, cannot be enlarged too much in order to improve portability. Thus, a size of the input area should be necessarily small. In order to surely perform the input even in such a small input area, an input assisting device can be conventionally used.

For example, Patent Document 1 discloses an input assisting device attached to a finger. The input assisting devise is comprised of a finger fitting portion formed in a ring shape and a pressing portion formed in a bar shape and fixed to the finger fitting portion. When the finger fitting portion is attached to the finger so that the pressing portion is extended along a dorsal surface of the finger, a tip of the pressing portion is projected approximately 5 mm from a fingertip. Since the input to the touch panel is performed by the projected portion, which is thinner than the finger, wrong operation such as touch of the neighboring input area is reduced.

Patent Document 2 discloses an input assisting device formed in a pen shape. The input assisting device is comprised of a pen body having a tapered tip portion and a transparent, thin and plate-shaped sliding member (slider) provided on the tip portion via a joint. The input is performed when the slider is brought into surface contact with the input area of the touch panel. Since the tip portion is thin and the slider is transparent, visibility of the tip of the pen is secured and the input can be more accurate than other pen-type input assisting devices. In addition, since the joint is bidirectionally rotatable, even when an angle between the tip portion and the slider is changed, the surface contact between a bottom surface of the slider and a top surface of the touch panel is maintained. As another embodiment of the pen-type input assisting device, it is disclosed that the pen body is formed in a cylindrical bag shape capable of covering the finger and the finger is inserted into a portion of the cylindrical bag shape when in use.

[Patent document 1] Japanese Unexamined Patent Application Publication No. H7-104925

[Patent document 2] Japanese Unexamined Patent Application Publication No. 2012-247942

[Patent document 3] Japanese Unexamined Patent Application Publication No. 2005-141710

BRIEF SUMMARY OF THE INVENTION

In the input assisting device disclosed in Patent Document 1, the pressing portion is projected only 5 mm from the fingertip. Therefore, when operating the touch panel by the pressing portion, the fingertip comes close to the touch panel, and a part of the display screen is hidden by the fingertip. In the input assisting device disclosed in Patent Document 2, because of the pen shape, the pen body and a hand holding the pen body are located above the touch panel, and a part of the display screen is hidden by them.

When the object to be operated is static letters or figures, there is no serious problem even if a part of the display screen is hidden by the finger or the like because an operator looked at the display screen before and remembers what is displayed on the hidden part. However, when the object of the operation (input operation) is moving images, for example characters in a game, if the object image is moved to a portion hidden by the finger or the like, the operator may momentarily lose sight of the object image and the operation to the object image may delay. This causes a serious problem when playing the game requiring a high operating speed, for example.

The present invention provides an input assisting device for a touch panel for preventing the display screen from being hidden by the input assisting device itself and the finger or the like to hold the input assisting device to a certain extent.

The present invention provides an input assisting device for an electrostatic capacitance type touch panel, comprising: a body portion that has a ring-shaped attaching portion to be attached to a predetermined portion of a finger and a retaining portion to be fit with a fingertip of the finger, the retaining portion having a surface to be contacted with an inner surface of the finger, a tip of the surface being warped toward the inner surface of the finger; a linear portion that has a width of 5 mm or less and is attached to the retaining portion so that the linear portion is projected 10 mm or more from the fingertip when the attaching portion is attached to the predetermined portion; a contact portion that is provided on a tip portion of the linear portion so that the contact portion is directed toward the inner surface of the finger when the attaching portion is attached to the predetermined portion, a tip of the contact portion being not formed as a flat plane; and the contact portion is electrically connected with the finger when the attaching portion is attached to the predetermined portion.

In the input assisting device of the present invention, the predetermined portion of the finger is a portion preliminarily supposed to be attached to the attaching portion. In general, the predetermined portion is the tip side compared to the first joint or a portion between the first joint and the second joint of the fingertip. In addition, the input assisting device of the present invention is generally attached to an index finger. In some case (some person), the input assisting device can be attached to a middle finger or a third finger.

The "width" of the linear portion means the width viewed from a nail side of the finger when the attaching portion is attached to the finger. The "toward the inner surface of the finger" means a direction directed from a nail to the inner surface of the finger.

In the input assisting device of the present invention, when the input to the touch panel is performed, the attaching portion is attached to the predetermined portion of the finger, the inner surface of the finger is faced with the front surface of the touch panel, and the front surface of the touch panel is operated by the contact portion so that the bottom surface of the contact portion provided on the tip portion of the linear portion is approximately parallel to the front surface of the touch panel. As explained above, when the input to the touch panel is performed by using the input assisting device of the present invention, the linear portion is projected more than 10 mm from the fingertip and nothing is around the input object except for the linear portion having the width of 5 mm or less, which is sufficiently thinner than the fingertip, and the contact portion provided on the tip portion of the linear portion. Therefore, the display screen of the touch panel is prevented from being hidden by the finger and the input assisting device itself. As a result, the operator does not lose sight of the images even when the images are moved to a certain extent. Note that the linear portion is preferably projected 20 mm or more from the fingertip in order to grasp a state of the screen near the input area as a whole, and to cope with the input for fast moving images in the game or the like. On the other hand, the projected length is preferably approximately 100 mm or less. If the projected length is too long, it is difficult to correctly perform the input. Similarly, the width of the linear portion is preferably 3.5 mm or less.

The input system of the touch panel to apply the present invention is an electrostatic capacitance type. Therefore, in the input assisting device of the present invention, the contact portion is electrically connected with the finger when the attaching portion is attached to the predetermined portion. Conventionally, Patent Document 3 discloses an input assisting device having similar configuration as the present invention for operating a small keys of a keyboard of a small personal computer. However, the input assisting device of Patent Document 3 is not for the electrostatic capacitance type touch panel, and therefore conductivity is not required. In addition, a physical force should be applied to the tip to operate the keyboard. Therefore, it is not practical to use an extremely thin linear portion. Suppose that the input assisting device of Patent Document 3 is used for a pressure sensitive (resistive film) touch panel, the touch panel should be pushed strongly in order to surely perform the operation. Therefore, the operator may not correctly follow the object rapidly moving in the screen (touch panel). On the other hand, the input assisting device of the present invention is for the electrostatic capacitance type touch panel. Therefore, as long as the input assisting device is electrically connected with the object, the linear portion can be sufficiently thin. Even if such a configuration is adopted, the operator can correctly follow the object rapidly moving in the screen (touch panel).

The linear portion is projected from the inner surface of the finger toward the fingertip when the attaching portion is attached to the predetermined portion.

From the configuration above, the linear portion approaches closer to the touch panel, and therefore the input can be more correctly performed.

The linear portion can be fixed with the retaining portion. On the other hand, the linear portion can be extendable from the retaining portion toward a direction of the fingertip.

When operating the fast moving images such as a character, the fixed linear portion is preferred to be a fixed type to avoid unexpected extension, for example.

If the linear portion is extendable, the linear portion can be extended to prevent the images from being hidden by the finger when the input is performed for the moving images such as a character. On the other hand, the linear portion can be shortened to enable a certain and subtle operation in other situations.

The contact portion can be specified to be capable of being tilted.

From the configuration above, when the contact portion is in contact with the input target displayed on the touch panel, even if the finger attaching the input assisting device or the touch panel is slightly moved, the contact portion can be tilted to absorb the movement. Thus, the input can be stably performed.

The attaching portion can be ring-shaped to be attached to the finger. The "ring-shaped" includes not only complete ring shape but also C shape formed by cutting a part of the ring shape.

By using the input assisting device of the present invention, the display screen of the touch panel is prevented from being hidden by the input assisting device itself or the finger holding the input assisting device, for example. Therefore, the operator can always follow the moving images and surely perform the input.

DETAILED DESCRIPTION OF THE INVENTION

An input assisting device concerning an embodiment of the present invention will be explained in detail with reference to FIG. 1 and FIG. 2.

Figure 1:
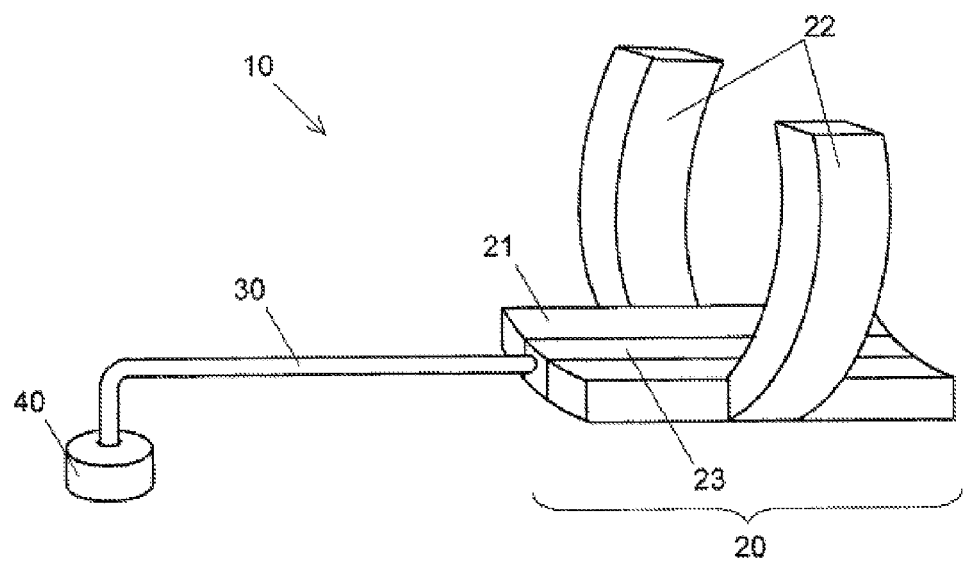
FIG. 1 is an upper perspective view of an input assisting device concerning an embodiment of the present invention.

As shown in FIG. 1, an input assisting device 10 of the present embodiment is comprised of a body portion 20 to be attached to a finger F, a linear portion 30 attached to the body portion 20, and a contact portion 40 provided on a tip of the linear portion 30. In the input assisting device 10 of the present embodiment, the body portion 20 (later described attaching portion 22) is supposed to be attached to the tip side compared to the first joint of the fingertip. Note that this part is referred to as "fingertip" in the present invention.

As shown in FIG. 1, the body portion 20 is comprised of an attaching portion 22 having C shape and a retaining portion 21 having a shape to be fit with an inner surface of the finger. The retaining portion 21 is fixed to a center of the C shape of the attaching portion 22. Since the attaching portion 22 has C shape, the attaching portion 22 can be attached to the finger F even if a thickness of the finger F slightly differs depending on the user. A conductive portion 23 is formed on the retaining portion 21 at a portion to be in contact with the inner surface of the finger F when attached to the finger F.

Figure 2A:
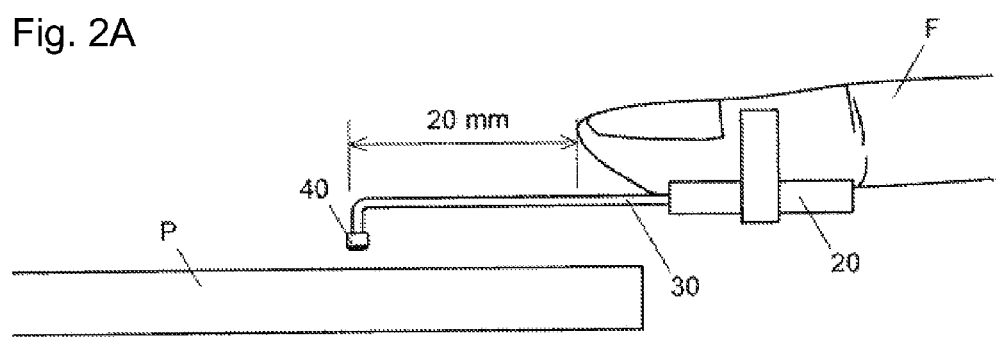
FIG. 2 is a side view showing a state that the input assisting device of the embodiment is used on the touch panel.
Figure 7:
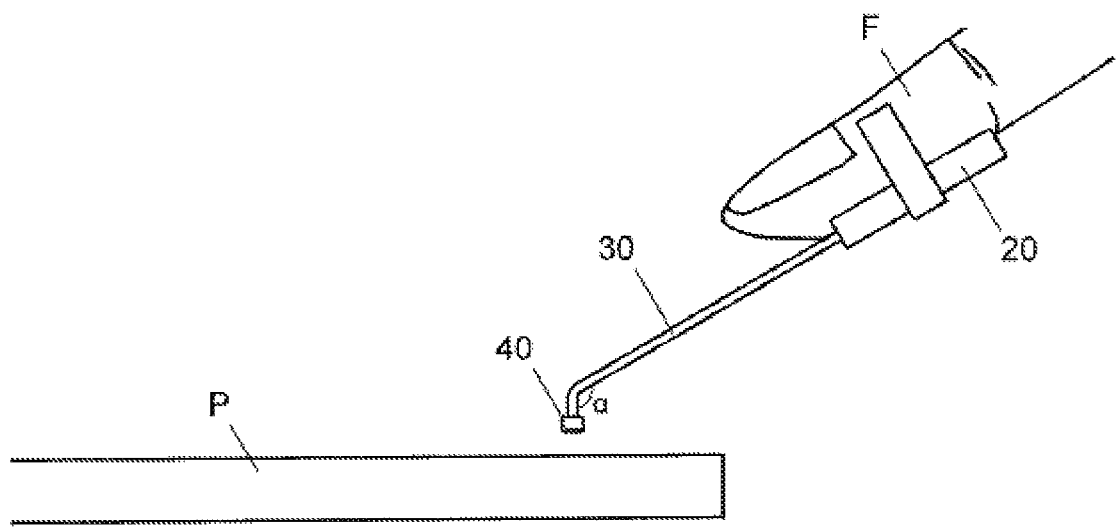
FIG. 7 is a side view showing a state that the another variation example of the input assisting device is used on the touch panel.

The linear portion 30 is made of a wire having a diameter of approximately 2 mm. As shown in FIG. 2A, the linear portion 30 is fixed on the retaining portion 21 so that the linear portion 30 is projected approximately 20 mm from a fingertip when the attaching portion 22 is attached to the finger F in the above described manner. Note that the projected length of the linear portion 30 projected from the fingertip can be any value as long as it is 10 mm or more. A tip of the linear portion 30 is bent approximately at right angles toward the inner surface of the finger F, i.e., from the nail to the inside of the finger F. Note that a bending angle α of the linear portion 30 can be more than 90° as shown in FIG. 7 so that a distance between the finger F and a touch panel P becomes longer.

The contact portion 40 is made of a cylindrical conductive rubber. A diameter of the contact portion 40 is approximately 5 mm. The contact portion 40 is fixed on a tip of the bent portion of the linear portion 30. A lower surface of the contact portion 40 is curved into a slightly convex shape. As explained above, the contact portion 40 is formed on the tip of the linear portion 30, the tip of the contact portion 40 is not formed as a flat plane, and tip of the contact portion is formed to be directed from a nail to the inner surface of the finger.

The contact portion 40 is electrically connected with the linear portion 30. In addition, the linear portion 30 is electrically connected with the conductive portion 23 provided on the retaining portion 21. Therefore, when the attaching portion 22 is attached to the finger F, the contact portion 40 is electrically connected with the finger F.

Figure 2B:
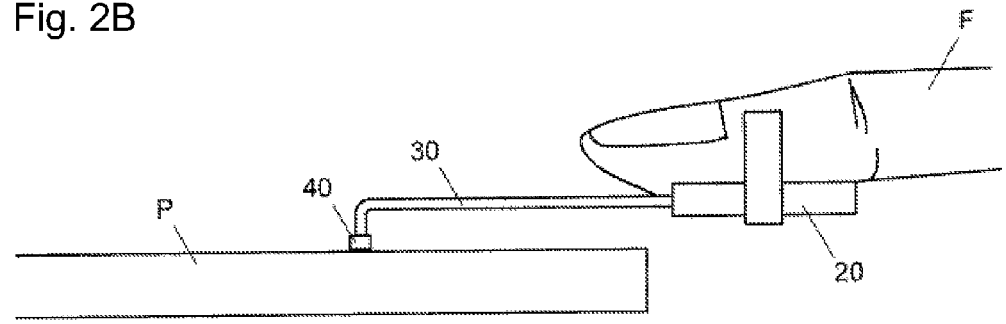

In the input assisting device 10 of the present embodiment, as shown in FIG. 2A, the attaching portion 22 is attached to the fingertip (the tip side compared to the first joint of the finger F). The above described attachment position corresponds to the predetermined position in the input assisting device 10 of the present embodiment. When the input is performed on the touch panel P, as shown in FIG. 2B, the input area of the touch panel P is touched by the lower surface of the contact portion 40 so that the linear portion 30 becomes approximately parallel to a surface of the touch panel P.

As explained above, in the input assisting device 10 of the present embodiment, nothing except for a thin wire having the thickness of 2 mm exists on an area within a range of approximately 20 mm around the contact portion 40, which is the input area. Therefore, the images or the like displayed on the touch panel P are almost completely prevented from being hidden. As a result, when the image on the display screen is stationary, the input area can be easily recognized and wrong operation can be avoided. Even when the image displayed on the input area is moving (e.g. a character), the operator does not lose sight of the images and delay of the operation to the input area can be prevented.

(Variation Example 1)

Figure 3:
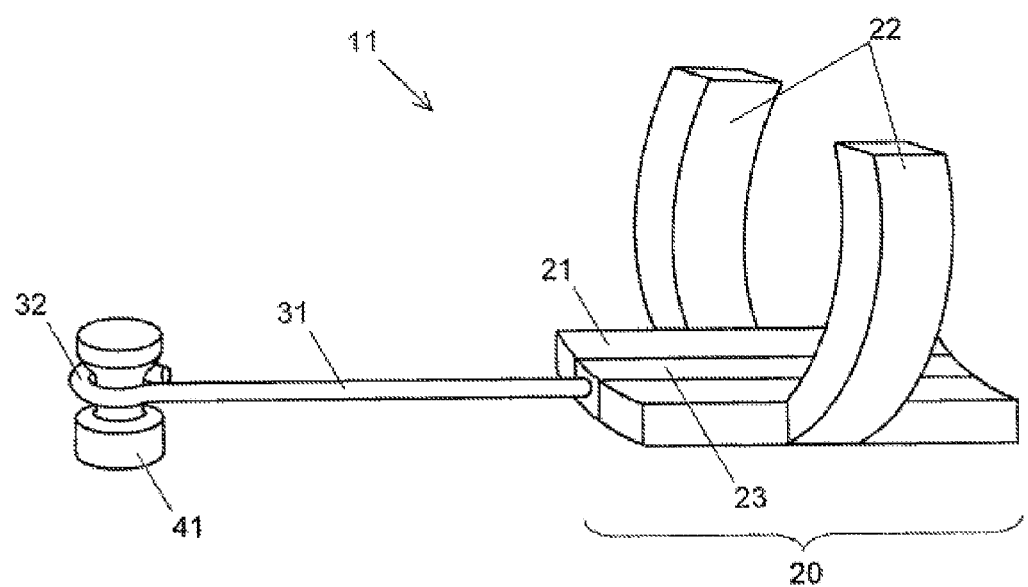
FIG. 3 is an upper perspective view of a variation example concerning the embodiment of the input assisting device.

A variation example of the input assisting device of the above described embodiment will be explained with reference to FIG. 3 and FIG. 4. In an input assisting device 11 of the variation example, as shown in FIG. 3, an annular portion 32 is formed on a tip of a linear portion 31, and a hourglass-shaped contact portion 41 is loosely fitted the annular portion 32. A conductive rubber is attached to a lower surface of the contact portion 41. The lower surface of the conductive rubber is curved into a slightly convex shape.

Explanation of other configurations is omitted because the configurations are same as the above described embodiment.

Figure 8:
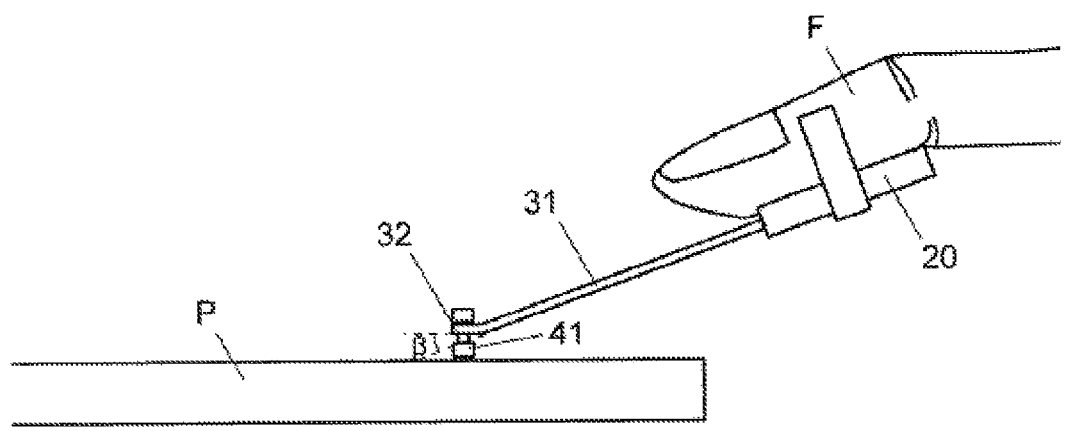
FIG. 8 is a side view showing a state that the another variation example of the input assisting device is used on the touch panel.

Note that in the above described variation example, as shown in FIG. 8, a tip of the linear portion 31 (i.e., the annular portion 32) can be slightly bent toward the nail side of the finger F at an angle β so that a distance between the finger F and the touch panel P becomes longer.

Figure 4A:
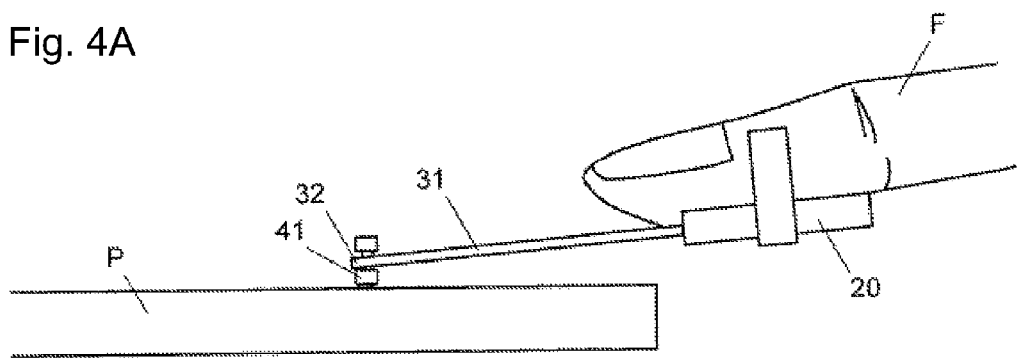
FIG. 4 is a side view showing a state that the input assisting device of the variation example is used on the touch panel.
Figure 4B:
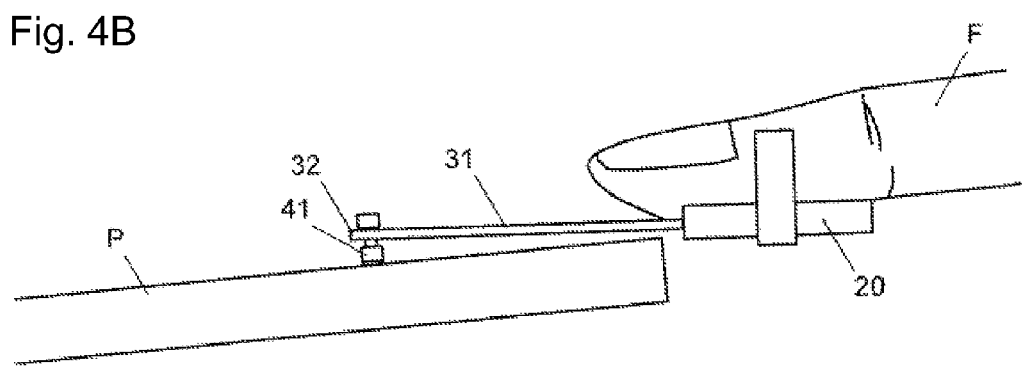

In the input assisting device 11, the contact portion 41 can be specified to be capable of being tilted with respect to the linear portion 31. Thus, even when the finger F attaching the input assisting device 11 is slightly inclined as shown in FIG. 4A or when the touch panel P is slightly inclined as shown in FIG. 4B, the contact portion 41 can absorb the deviation of the inclination. Therefore, the touch panel P and the contact portion 41 can be kept in touch and the operator can perform the input stably.

(Variation Examples 2, 3)

Another variation example of the input assisting device of the above explained embodiment will be explained with reference to FIG. 5.

In an input assisting device 12 of a variation example 2 and an input assisting device 13 of a variation example 3, the projected length of linear portions 33, 34 projected from the fingertip can be variable.

Figure 5A:
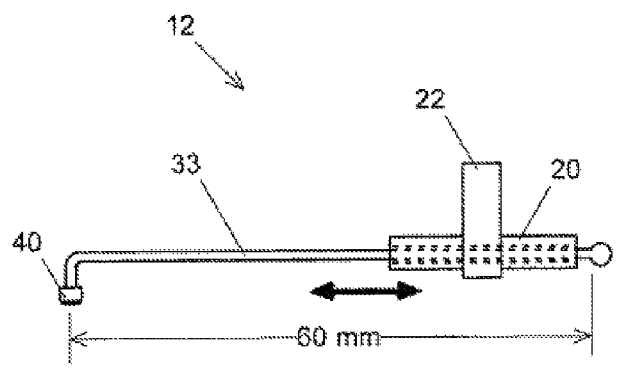
FIGS. 5A and 5B are side views of another variation example concerning the embodiment of the input assisting device.

Specifically, in the input assisting device 12 of the variation example 2, as shown in FIG. 5A, the linear portion 33 of the input assisting device 12 passes through the body portion 20 so as to be longitudinally slidable with respect to the body portion 20. A total length of the linear portion 33 is approximately 60 mm. The length is almost fixed at an arbitrary position by friction. The length projected from the fingertip is adjustable.

Figure 5B:
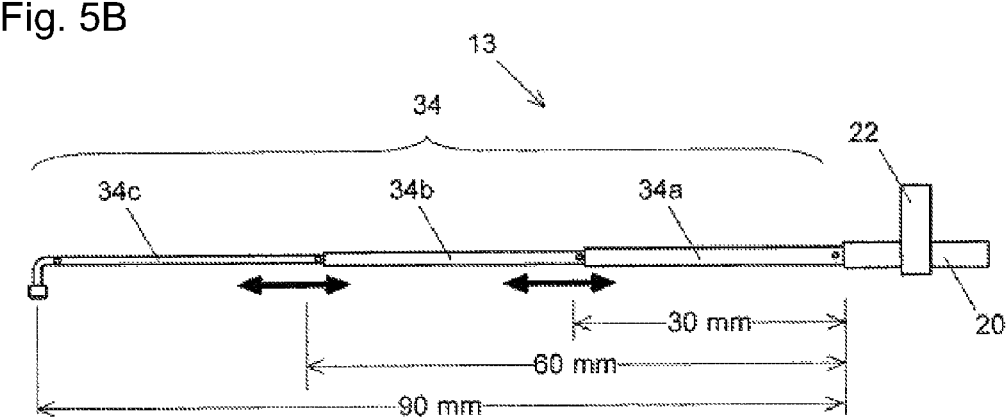

In the input assisting device 13 of the variation example 3, as shown in FIG. 5B, the linear portion 34 of the input assisting device 13 is formed by multiply connected cylindrical bodies 34a to 34c. The cylindrical bodies 34a to 34c are slidably extendable to three lengths: approximately 30, 60 and 90 mm.

The linear portion 33 of the input assisting device 12 in the variation example 2 and each of the cylindrical bodies 34a to 34c of the input assisting device 13 in the variation example 3 are not rotated when they are extended and contracted. Even if the length of the linear portion 33 or the linear portion 34 is changed, the contact portion 40 is always directed toward the inner surface of the finger.

Explanation of other configurations of the input assisting devices 12, 13 of the variation examples 2, 3 is omitted because the configurations are same as the above described embodiment.

In the input assisting device 12, 13 of the variation examples 2, 3, the projection length of the linear portions 33, 34 projected from the fingertip can be changed. Therefore, in order to prevent the touch panel P from being hidden by the finger F, the length of the linear portions 33, 34 can be adjusted depending on the size of the touch panel P, the position of the input area in the touch panel P, the presence of movement of the object image as the input area, and the like. Specifically, when the touch panel P is large or the object image as the input area is rapidly moving, the linear portions 33, 34 can be extended to prevent the display screen from being hidden by the finger F. Thus, visibility of the operator can be secured. When the touch panel P is small or the input area is small, and when the object image as the input area is not rapidly moving or not moving, the length of the linear portions 33, 34 can be contracted to enable a certain and subtle operation.

The input assisting device described in the above embodiment and the variation examples is merely an example of the present invention. The input assisting device can be arbitrarily deformed, revised or modified within the purpose of the present invention.

Figure 6A:
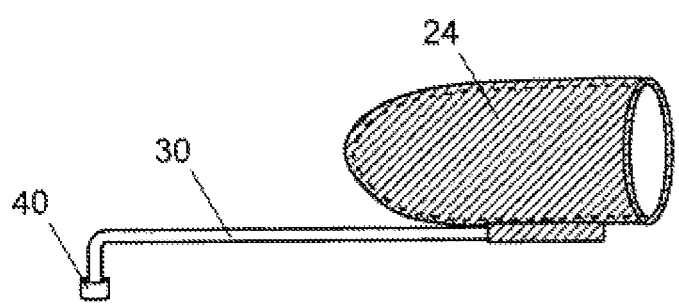
FIG. 6A is a side view and FIG. 6B is a top view of another variation example concerning the embodiment of the input assisting device.
Figure 6B:
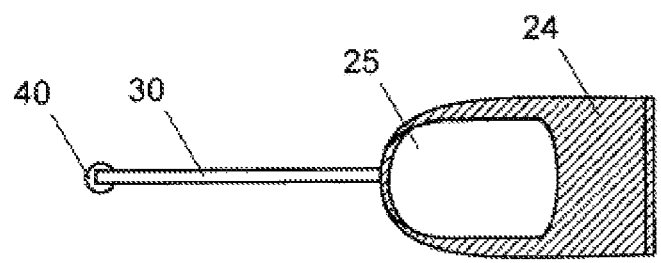

For example, as shown in FIG. 6A, the attaching portion can be formed like a cap (finger sack) 24 made of a thin rubber having a cylindrical bag shape. In this case, as shown in FIG. 6B, an opening 25 can be formed on the cap-shaped attaching portion 24 at a portion attached to a nail. Thus, the input assisting device can be attached to the finger even when an artificial nail is attached to the finger.

(Embodiment)

Figure 9A:
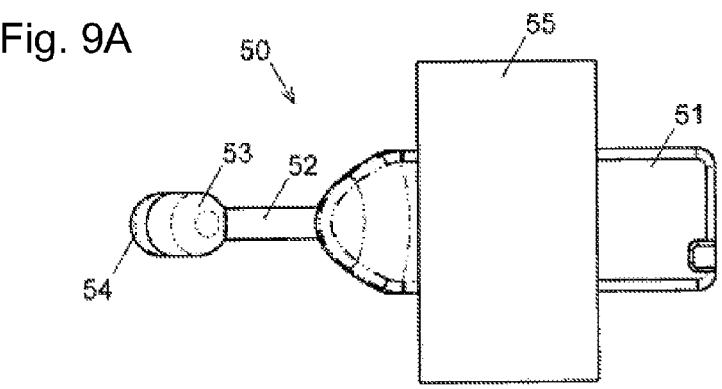
FIG. 9A is a top view.
Figure 9B:
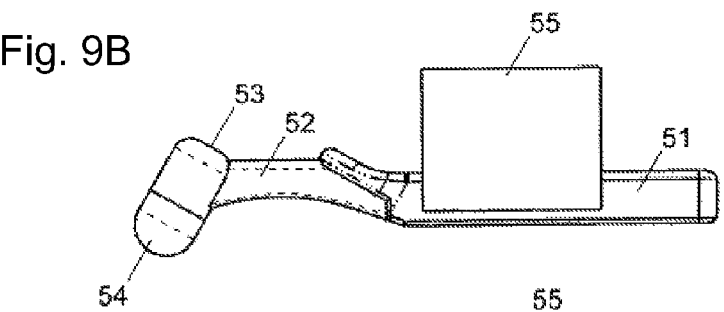
FIG. 9B is a left side view.
Figure 9C:
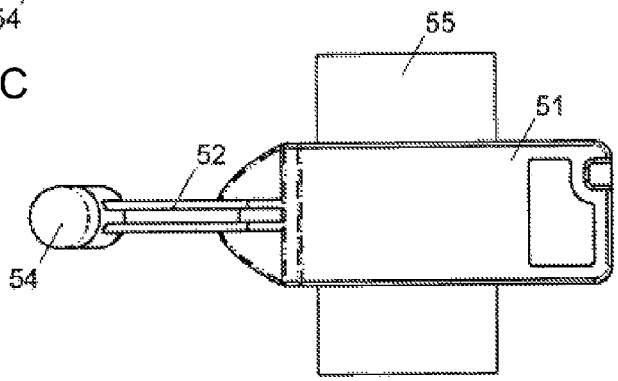
FIG. 9C is a bottom view.
Figure 9D:
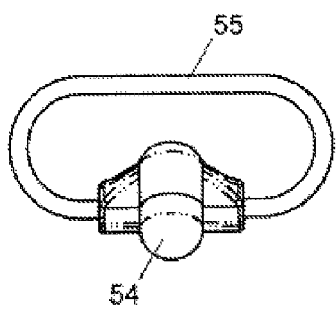
FIG. 9D is a front view.
Figure 9E:
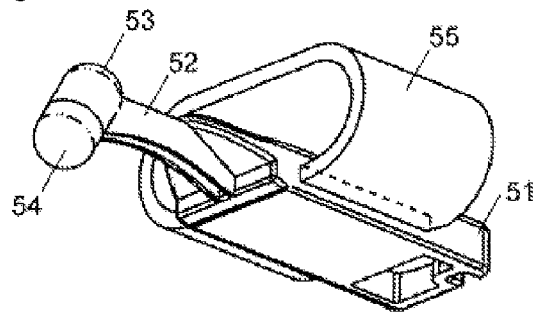
FIG. 9E is a perspective view of the input assisting device concerning another embodiment of the present invention.

Another embodiment of the present invention is shown in FIGS. 9A to 9E. In an input assisting device 50 of the embodiment, as shown in FIG. 9A, a body portion 51, a linear portion 52 and a tip portion 53 are formed integrally with each other by using a conductive resin. A contact portion 54 made of a conductive rubber is attached to a lower side of the tip portion 53. A ring-shaped attaching portion 55 is provided on the body portion 51. The body portion 51 is fixed to the inside surface of the finger by inserting the finger into the attaching portion 55. The attaching portion 55 is preferred to be formed of a cloth, a non-woven fabric, a plastic or other materials.

In the input assisting device 50, a width of the linear portion 52 is 3.5 mm, and a projected length from the tip portion of the body portion 51 is approximately 10 mm. Since the tip portion of the body portion 51 is warped upward toward the fingertip, the tip portion of the body portion 51 is fit with the tip of the inner surface of the finger when the attaching portion 55 is attached to the finger. Thus, the position of the tip portion approximately matches with the position of the fingertip. Namely, the retaining portion, which is formed at the tip portion of the retaining portion, has a surface to be contacted with the inner surface of the finger and a tip of the surface is warped toward the inner surface of the finger. Because of this, whole the fingertip of the operator can be in touch with the body portion 51 of the input assisting device 50. Thus, the operator can surely perform the subtle operation even for the object such as a character rapidly moving on the touch panel.

The input assisting device 50 of the present embodiment is formed integrally with each other by using a resin. Therefore, the input assisting device can be manufactured at a low cost. The width of the linear portion 52 can be specified in consideration of a balance with the strength of the resin. When using high strength resin, the width can be 2 mm. When using low strength (i.e., low cost) resin, the width can be 5 mm.

In the input assisting device of the present embodiment, various variation examples can be applied same as the previous embodiment.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. An input assisting device for an electrostatic capacitance type touch panel, comprising:
    a body portion that has a ring-shaped attaching portion to be attached to a predetermined portion of a finger and a retaining portion to be fit with a fingertip of the finger, the retaining portion having a surface to be contacted with an inner surface of the finger, a tip of the surface of the retaining portion being warped upward toward the fingertip so that a position of the tip of the surface matches with the fingertip;
    a linear portion that has a width of 3.5 mm or less and is attached to the retaining portion so that the linear portion is projected 10 mm or more from the fingertip when the attaching portion is attached to the predetermined portion; and
    a contact portion that is made of a conductive rubber and attached to a lower side of a tip portion of the linear portion so that the contact portion is directed from a nail to the inner surface of the finger when the attaching portion is attached to the predetermined portion, a tip of the contact portion being not formed as a flat plane, wherein
    the linear portion and the tip portion are formed integrally with each other by using a conductive resin,
    the attaching portion is formed of a cloth, a non-woven fabric or a plastic; and
    the contact portion is electrically connected with the finger when the attaching portion is attached to the predetermined portion.

2. The input assisting device for the electrostatic capacitance type touch panel to claim 1, wherein
    the linear portion is fixed with the retaining portion.

3. The input assisting device for the electrostatic capacitance type touch panel to claim 1, wherein
    the linear portion is extendable from the retaining portion toward a direction of the fingertip.

4. The input assisting device for the electrostatic capacitance type touch panel to claim 1, wherein
    the contact portion is capable of being tilted.

5. The input assisting device for the electrostatic capacitance type touch panel to claim 1, wherein the linear portion is projected 20 mm or more from the fingertip when the attaching portion is attached to the predetermined portion.

* * * * *